DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 21, 1972

904 O.G. 276

T904,028
SELF-HEATING DIFFUSION TRANSFER FILM UNIT

Frederick E. Ford and Hugh S. A. Gilmour, both of Kodak Park Works, Rochester, N.Y. 14650

Filed Feb. 4, 1972, Ser. No. 223,774
**Int. Cl. G03c *1/48***
U.S. Cl. 96—76
No Drawing. 11 Pages Specification

A self-heating photographic film unit useful in black-and-white or color transfer processes comprises:

(a) a photographic element comprising a support having thereon at least one silver halide emulsion layer,
(b) an image-receiving layer, and
(c) means for discharging an alkaline processing composition within the film unit, such as a rupturable container, the film unit containing a silver halide developing agent and a heat-generating means for raising the temperature of the film unit during processing from about 10–30° F. over the ambient atmospheric temperature.

Heat-generating means disclosed include acid-base and oxidation-reduction materials which produce heat upon reaction. Specific acidic materials disclosed include polymeric acids such as a copolymer of maleic anhydride and methyl vinyl ether. Specific alkaline materials disclosed include sodium and potassium hydroxide. Oxidation-reduction materials disclosed include thioureahydrogen peroxide. One component of the exothermic pair can be incorporated in the processing composition while the other is incorporated in the photosensitive element or image-receiving layer. The heat-generating materials may also be incorporated in two rupturable containers or one container with two compartments. Since the heat-generating means is in the photographic film unit itself, it is generally more efficient than supplying heat to the film unit by external means.